Figure 1A:
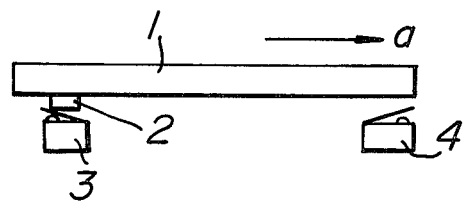

United States Patent [19]

Kasuga

[11] 4,159,173

[45] Jun. 26, 1979

[54] DEVICE FOR CONTROLLING A REVERSE TIME OF A MANUSCRIPT CARRIAGE, ETC. FOR ELECTROGRAPHIC APPARATUSES

[75] Inventor: Muneo Kasuga, Hachioji, Japan

[73] Assignee: Olympus Optical Company Limited, Tokyo, Japan

[21] Appl. No.: 790,694

[22] Filed: Apr. 25, 1977

[30] Foreign Application Priority Data

Apr. 28, 1976 [JP] Japan .................................. 51/52461

[51] Int. Cl.² ............................................ G03G 15/28
[52] U.S. Cl. .......................................... 355/8; 355/14; 361/167
[58] Field of Search ...................... 318/284; 355/8, 14; 361/166, 167

[56] References Cited

U.S. PATENT DOCUMENTS

| | | | |
|---|---|---|---|
| 3,008,074 | 11/1961 | Gregory | 318/284 X |
| 3,230,435 | 1/1966 | Andrews | 318/284 |
| 3,566,228 | 2/1971 | Tsergas et al. | 318/284 X |
| 3,711,198 | 1/1973 | Nordine | 355/8 X |
| 3,743,274 | 7/1973 | Komori | 355/8 X |
| 3,990,792 | 11/1976 | Kono et al. | 355/8 |
| 3,997,262 | 12/1976 | Doi et al. | 355/8 X |
| 4,012,138 | 3/1977 | Washio et al. | 355/14 X |

Primary Examiner—William M. Shoop
Attorney, Agent, or Firm—Haseltine, Lake & Waters

[57] ABSTRACT

A device for controlling a reverse time of a manuscript carriage, etc. for electrographic apparatuses is disclosed. The device comprises means for disengaging a forward movement electromagnetic clutch from a manuscript carriage or optical system driving mechanism and, after a lapse of time from the moment of disengaging the forward movement clutch from the manuscript carriage or optical system driving mechanism, for driving a backward movement clutch. The device is capable of effectively prevent the backward movement clutch and a carriage supporting plate, etc. from being subjected to heavy load and of effecting a reciprocal movement of the manuscript carriage or optical system in a smooth manner.

1 Claim, 4 Drawing Figures

DEVICE FOR CONTROLLING A REVERSE TIME OF A MANUSCRIPT CARRIAGE, ETC. FOR ELECTROGRAPHIC APPARATUSES

This invention relates to a device for controlling a reverse time of a manuscript carriage, etc. for electrographic apparatuses which can effects light exposure and scanning of a manuscript disposed on a carriage by reciprocally moving the carriage or an optical system.

Heretofore, it has been the common practice to mainly use an electromagnetic clutch as means for reciprocally moving a manuscript carriage, etc. for an electrographic apparatus. The electromagnetic clutch functions to reciprocally move the manuscript carriage, etc. by connecting an output shaft of each of a forward movement clutch and backward movement clutch to a rotary shaft of a driving motor one after the other. More particularly, as means for disengaging the output shaft of the forward movement clutch from the rotary shaft of the driving motor and for engaging the output shaft of the backward movement clutch to the rotary shaft of the driving motor, use has been made of means inclusive of a microswitch. Such means is constructed such that when the manuscript carriage or optical system arrives at the end of the forward movement thereof, the microswitch functions to deliver a signal which disengage the output shaft of the forward movement clutch from the rotary shaft of the driving motor and at the same time to engage the backward movement clutch to the latter. In the reciprocal movement of the conventional manuscript carriage, etc., inertia produced due to the forward movement of the manuscript carriage, etc. acts upon the backward movement clutch, supporting plate of the manuscript carriage, etc. particularly at the moment of starting the backward moment thereof. As a result, the reciprocal movement of the manuscript carriage, etc. becomes slow in motion in dependence with the copying speed and the backward movement clutch and manuscript carriage become shortened in life.

An electrographic apparatus which is constructed such that the above mentioned inertia produced due to the forward movement of the manuscript carriage, etc. is eliminated by a stopper, etc. and then the backward movement of the manuscript carriage, etc. is started, has also been proposed. In such electrographic apparatus, however, when the manuscript carriage arrives at the end of the forward movement thereof and collides with the stopper, etc. the manuscript carriage is subjected to considerably large shocks.

As a result, the manuscript carriage, etc. or the electrographic apparatus itself becomes shortened in life. In addition, the presence of the stopper, etc. eventually causes failure to the electrographic apparatus.

An object of the invention, therefore, is to provide a device for controlling a reverse time of a manuscript carriage, etc., which can sufficiently alleviate inertia produced due to the forward movement of the manuscript carriage, etc. without using stopper, etc. and then starting the backward movement thereof.

A feature of the invention is the provision of a device for controlling a reverse time of a manuscript carriage, etc. for electrographic apparatuses comprising a casing, an optical system or a manuscript carriage mounted on the casing so as to be reciprocally movable therealong, and a driving mechanism including forward and backward movement electromagnetic clutches and reciprocally moving the optical system or manuscript carriage so as to effect light exposure and scanning of a manuscript disposed on the manuscript carriage characterized by comprising means for driving said forward movement clutch and forwardly moving said optical system or manuscript carriage, and means for disengaging said forward movement clutch from said carriage driving mechanism immediately before the end of the forward movement of said manuscript carriage and after a lapse of a given time for driving said backward movement clutch and backwardly moving said optical system or manuscript carriage.

In carrying out the invention, the above mentioned means for releasing said forward movement clutch from said driving motor immediately before the end of the forward movement of the optical system or manuscript carriage and after a lapse of a given time for driving the backward movement clutch is composed of a timer circuit inclusive, for example, a capacitor and a resistor, and having a time constant of several hundreds milliseconds.

Figure 1B:
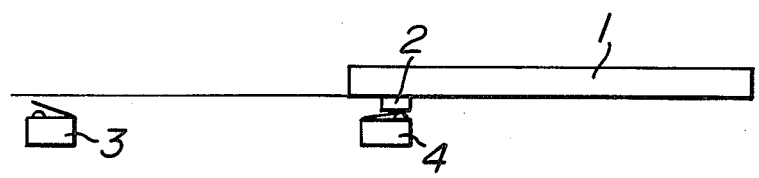
Figure 1C:
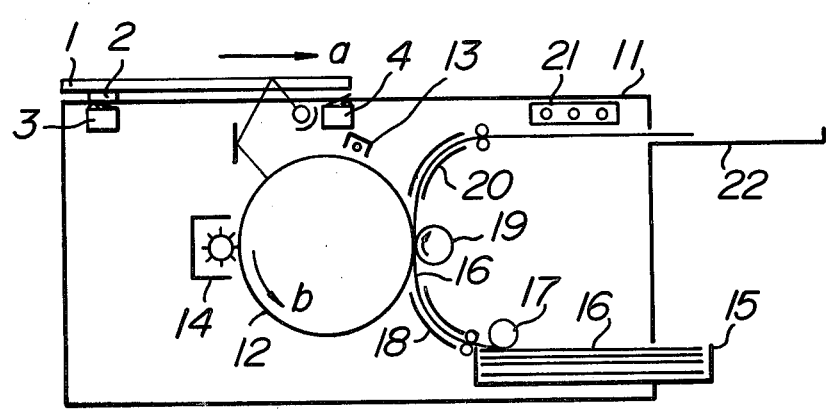
Figure 2:
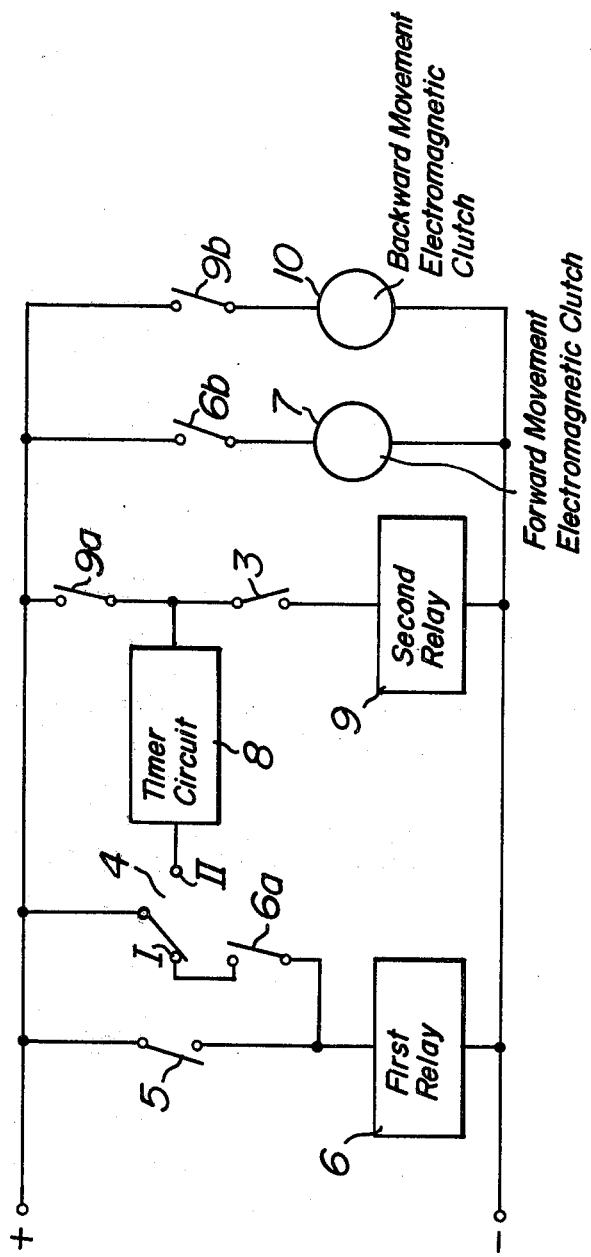

The invention will now be described in greater detail with reference to the accompanying drawings, wherein:

FIG. 1A diagrammatically shows a manuscript carriage ready for starting its forward movement;

FIG. 1B is a view similar to FIG. 1A, but diagrammatically showing a manuscript carriage ready for starting its backward movement;

FIG. 1C diagrammatically shows one embodiment of an electrographic apparatus to which is applied a device for controlling a reverse time of a manuscript carriage, etc. according to the invention; and FIG. 2 is an electric circuit diagram showing one embodiment of a device for controlling a reverse time of a manuscript carriage, etc. according to the invention.

In FIGS. 1A, 1B and 1C is diagrammatically shown a construction of an embodiment of an electrographic apparatus to which is applied a device for controlling a reverse time of a manuscript carriage, etc. according to the invention. In the present embodiment, a manuscript carriage 1 is slidably mounted on a casing 11 for enclosing the electrographic apparatus therein. The manuscript carriage 1 is reciprocally moved along the casing 11 so as to cause a manuscript disposed on the carriage 1 to be exposed to and scanned by a light emitted from a light source. The carriage 1 is provided at its lower surface with a projection 2. The projection 2 is located in the rear end of the lower surface of the carriage 1 seen from a forwardly moving direction of the carriage 1 shown by an arrow a. When the carriage 1 is in a starting position of its forward movement shown in FIG. 1A, the projection 2 functions to make a normally closed switch 3 open to stop a backward movement of the carriage 1.

If a print switch (not shown) is made ON, a photosensitive drum 12 begins to rotate in a counterclockwise direction shown by an arrow b. At the same time, a start switch 5 interlocked with the print switch becomes operated to cause the carriage 1 to move forwardly in a direction shown by an arrow a. The manuscript disposed on the carriage 1 is projected through an optical system on the photosensitive drum 12. The photosensitive drum 12 is uniformly charged by a corona discharge device 13 arranged in the rear of the manuscript projected portion of the photosensitive drum 12 as seen from the rotating direction thereof. As a result, the projected manuscript functions to produce an electro static latent image corresponding to the manuscript on the outer periphery of the photosensitive drum 12. This electric latent image is developed into a visible image by means of a developing device 14 which makes use of toner.

On the one hand, a record sheet 16 enclosed in a paper cassette 15 is taken up by a feed roller 17 which rotates in synchronism with rotation of the photosensitive drum 12 and then transferred through a guide 18 to a space formed between the photosensitive drum 12 and a copying roller 19 where the manuscript image formed on the photosensitive drum 12 is copied to the record sheet 16. The record sheet 16 with the manuscript image copied thereon is supplied through a guide 20 to a heater 21 which functions to thermally fix the manuscript image on the record sheet 16 which is then delivered to a tray 22. After the light exposure and scanning of the manuscript have been completed, the carriage 1 arrives at the end of its forward movement shown in FIG. 1B. Then, the projection 2 secured to the lower surface of the carriage 1 causes a change-over switch 4 secured to the casing 11 to operate immediately before the backward movement of the carriage 1. As will be described later, at a short lapse of time after the change-over switch 4 has been operated, the carriage 1 begins its backward movement in a direction opposite to the direction shown by the arrow a. This backward movement of the carriage 1 is stopped when the carriage 1 arrives at the end of the backward movement thereof shown in FIG. 1B. Then, the projection 2 causes the switch 3 to open and hence the carriage 1 becomes ready to repeat the next copying operation.

In FIG. 2 is shown an electric circuit embodying a device for controlling a reverse time of the carriage 1 shown in FIG. 1. In the present embodiment, the same parts as those shown in FIG. 1 are designated by the same reference numerals. A normally open start switch 5 interlocked with a print switch (not shown) and adapted to start the forward movement of the carriage 1 is connected in series with a first relay 6 across a direct current source. The first relay 6 is provided with a self-holding contact arm 6a which is connected through a change-over switch 4 in parallel with the start switch 5. The change-over switch 4 is parallel with the start switch 5. The change-over switch 4 is composed of a microswitch, etc. including two contact points I and II. A contact arm of the change-over switch 4 is normally closed to the contact point I. The first relay 6 is also provided with a normally open contact arm 6b which is connected in series with a forward movement electromagnetic clutch 7 across the direct current supply source. The contact point II of the change-over switch 4 is connected to one of terminals of a timer circuit 8, the other terminal being connected through a normally closed switch 3 and a second relay 9 to one of the terminals of the direct current supply source and connected through a self-holding contact arm 9a of the second relay 9 to the other terminal of the direct current supply source. The second relay 9 is provided with a contact arm 9b which is connected in series with a backward movement electromagnetic clutch 10 across the direct current supply source.

When the carriage 1 arrives at the end of the backward movement thereof shown in FIG. 1A, the normally closed switch 3 is brought into engagement with the projection 2 and becomes open as shown in FIG. 2. When the carriage 1 begins its forward movement and the projection 2 is disengaged from the normally closed switch 3 which is then closed. When the carriage 1 arrives at the end of the forward movement thereof shown in FIG. 1B, the block 4 secured to the carriage 1 causes the contact arm of the change-over switch 4 to make contact with the contact point II to operate the timer circuit 8. The timer circuit 8 is composed of a condenser and resistor, etc., for example, and has a time constant of several hundreds milliseconds.

The operation of the device for controlling the reverse time of the carriage will now be described with reference to FIGS. 1A, 1B and 2.

When the carriage 1 arrives at the end of the backward movement thereof shown in FIG. 1A, all of the switches take respective positions shown in FIG. 2. That is, the normally closed switch 3 is pushed by the projection 2 secured to the carriage 1 and becomes opened. In addition, the first and second relays 6 and 9 are in their inoperative positions, respectively. The contact arm of the change-over switch 4 is connected to the contact point I.

If the start switch 5 interlocked with the print switch (not shown) is closed for a short time, the first relay 6 becomes operated to close its self-holding contact arm 6a. As a result, even when the start switch 5 becomes opened after the lapse of the short time, the first relay 6 is held at its ON position through the closed self-holding contact arm 6a. In addition, when the first relay 6 becomes operative, its contact arm 6b is closed to drive the forward movement electromagnetic clutch 7 so that the carriage 1 is forwardly moved in a direction shown by an arrow a. As a result, the projection 2 secured to the carriage 1 is disengaged from the normally closed switch 3 to close it. But, in this case, the change-over switch 4 still makes contact with the contact point I and the contact arm 9a is still open, so that the second relay 9 is not energized.

If the carriage 1 arrives at the end of the forward movement thereof shown in FIG. 1B, the projection 2 secured to the carriage 1 causes the change-over switch 4 to bring its contact arm into contact with the contact point II, thereby making the first relay 6 OFF and opening its contact arm 6b and hence disengaging the forward movement clutch 7 from the driving mechanism. At the same time, the timer circuit 8 is energized through the closed contact arms 4 and 3 and the second relay 9. In this case, the second relay 9 becomes operative after the elapse of time which is equal to the time constant of the timer circuit 8, the time constant being several hundreds milliseconds in the present embodiment. During this time corresponding to the time constant, the carriage 1 is displaced over a short distance due to its enertia. When the carriage comes to a standstill after the elapse of the time constant of the timer circuit 8, the second relay 9 becomes operated to close its contact arms 9a, 9b. The contact arm 9a functions to hold the self-holding circuit of the relay 9. The contact arm 9b functions to operate the backward movement electromagnetic clutch 10, thereby starting the backward movement of the carriage 1.

In this case, the time elapsed from a moment at which the projection 2 causes the change-over switch 4 to operate to a moment at which the backward movement electromagnetic clutch 10 is operated to backwardly move the carriage 1 is very short as is defined by the time constant of the timer circuit 8, so that during such short time the carriage 1 moves in the forward direction shown by the arrow a by a short distance only. As a result, the projection 2 can maintain the contact arm of the change-over switch 4 in contact with the contact point II.

When the carriage 1 is backwardly moved and the projection 2 is separated from the change-over switch 4, the contact arm of the change-over switch 4 is brought into engagement with the contact point I as shown in FIG. 2.

As seen from the above, as soon as the forward movement clutch 7 is disengaged from the driving mechanism of the carriage 1, the timer circuit 8 is operated and after the lapse of time constant of the timer circuit 8 the second relay 9 is operated to engage the backward movement clutch 10 with the driving mechanism. As a result, it is possible to effectively alleviate the inertia produced due to the forward movement of carriage 1 within a time defined by the time constant of the timer circuit 8. Thus, the invention has the advantage that when the backward movement clutch 10 is engaged with the carriage driving mechanism, there is no risk of the clutch 10 and the carriage driving mechanism being subjected to heavy load, and that there is no need of providing a stopper, etc. for forcedly stop the forward movement of the carriage 1, thereby obviating shock to be produced when the carriage 1 collides with the stopper, etc.

When the carriage 1 arrives at the end of the backward movement thereof shown in FIG. 1A, the projection 2 secured to the lower surface of the carriage 1 is brought into engagement with the normally closed switch 3 which becomes thus opened to deenergize the second relay 9 and hence open its contact arm 9b, thereby disengaging the backward movement clutch 10 from the carriage driving mechanism and stopping the backward movement of the carriage 1. If the start switch 5 is closed for a short time, it is possible to repeat the above mentioned forward and backward movements of the carriage 1.

As stated hereinbefore, the invention is capable of starting the backward movement of the carriage 1 after a lapse of several hundreds milliseconds from the moment of disengaging the forward movement clutch 7 from the carriage driving mechanism. As a result, the inertia produced due to the forward movement of the carriage 1 is alleviated during several hundreds milliseconds and hence it is possible to effectively prevent the backward movement clutch 10 and the carriage supporting plate, etc. from being subjected to heavy load. Thus, the reciprocal movements of the carriage, etc. can be effected in a smooth manner.

The invention is not limited to the above mentioned embodiments and many alternations and modifications are possible. In the above described embodiment, the carriage is reciprocally moved for the purpose of effecting the light exposure and scanning of the manuscript. Alternatively, the carriage is made stationary and the optical system may be reciprocally moved for the purpose of effecting the light exposure and scanning of the manuscript. In addition, in the above described embodiment, as soon as the forward movement clutch 7 is disengaged from the carriage driving mechanism, the timer circuit 8 is operated and after a lapse of a given time the backward movement clutch 10 is brought into engagement with the carriage driving mechanism so as to effect the backward movement of the carriage 1. In the present invention, however, the timer circuit 8 is not always necessary. Provision may be made of two switches secured to the electrographic apparatus casing and separated from each other in the forward moving direction of the carriage 1. In such case, the rear switch functions to disengage the forward movement clutch 7 from the carriage driving mechanism and the front switch functions to bring the backward movement clutch 10 into engagement with the carriage driving mechanism. In this modified embodiment of the invention, it is possible to alleviate the inertia produced due to the forward movement of the carriage 1 when the carriage 1 is forwardly moved from the front switch to the rear switch. In addition, the device according to the invention may be applied to both the ends of the forward and backward movements of the carriage or optical systems. Such modified embodiment of the invention may be applied to an electrographic apparatus which can continuously form visible copies of a manuscript so as to effectively prevent both the forward and backward movement clutches from being subjected to heavy load.

What is claimed is:

1. A device for controlling a reverse time of a manuscript carriage and the like for an electrographic apparatus having an electric circuit including a direct current supply source, a start switch means including: a first relay, said start switch means and first relay being connected in series across said direct current supply source, a change-over switch operatively associated with a projection secured to the lower surface of a manuscript carriage and connected through a contact arm of said first relay, and a contact arm of said change-over switch connected to a first contact point thereof in parallel with said start switch, a second relay connected through a normally closed switch operatively associated with said projection and a contact arm of said second relay across said direct current supply source, a timer circuit connected to a contact arm and to a second contact point of said change-over switch and to a connection point between said normally closed contact arm and said contact arm of said second relay, said timer circuit having a time constant of several hundreds milliseconds, a forward movement electromagnetic clutch connected through a contact arm of said first relay across said direct current supply source, and a backward movement electromagnetic clutch connected through a contact arm of said second relay across said direct currect supply source.

* * * * *